Patented Oct. 10, 1933

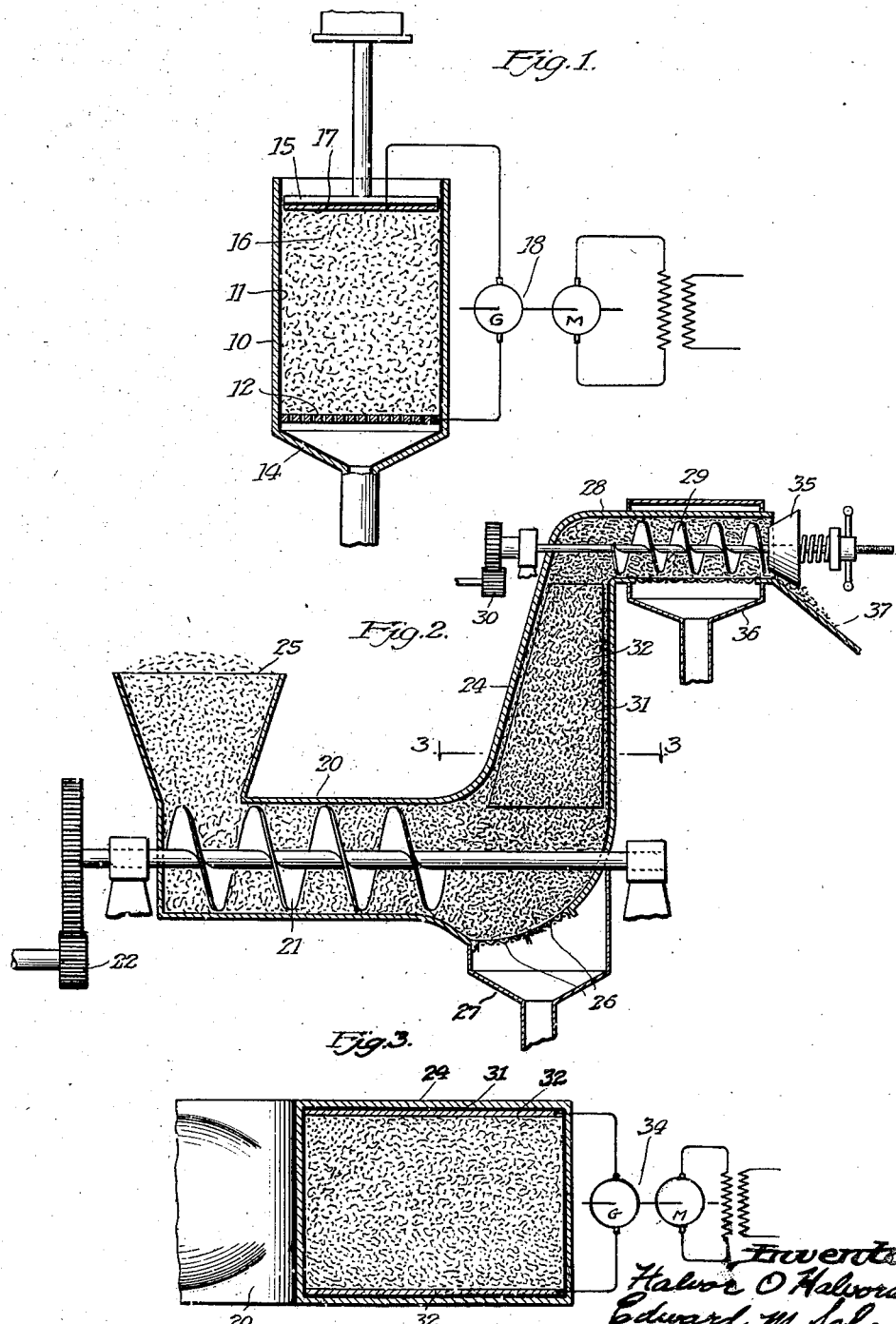

1,930,169

UNITED STATES PATENT OFFICE 1,930,169

RENDERING

Halvor Orin Halvorson, Ramsey County, and Edward M. Schmitz and Robert C. Murray, Austin, Minn., assignors to Geo. A. Hormel & Company, Austin, Minn., a corporation of Delaware Application August 29, 1930. Serial No. 478,612

15 Claims. (Cl. 87—13)

This invention relates to the rendering of fats, as for the making of lard.

The invention has for its general objects the provision of a method whereby fats may be rendered from natural tissue with increased rapidity and with minimum deleterious effect from the rendering heat and accompanying influences.

A particular object is the provision of such method whereby a mass of fat-containing tissue may be heated quickly and uniformly to a temperature effective to render out the fat, without involving the excessive heating of the mass in parts and the consequent deleterious effects on the fat.

Yet another object is the provision of such method whereby fats may be effectively sterilized incident to rendering at temperatures materially below that of boiling water and without prolonged subjection of the fat to the heat.

Yet another object is the provision of such method whereby a high percentage recovery of fat from natural tissues may be accomplished rapidly and economically.

Yet another object is the provision of such method particularly qualified to obtain the advantages above mentioned in the rendering of hog fat for production of lard.

Yet another object is the provision of such method whereby the rendering may be carried on either as a continuous procedure or as a batch treatment.

Other and further objects will be pointed out or indicated hereinafter or will be apparent to one skilled in the art upon an understanding of the invention or its employment in practice.

In the drawing forming a part of this specification we show, and hereinafter describe, certain examples of procedure and apparatus which will serve to explain the practice of the invention, but it is to be understood that these are presented for purpose of illustration merely and are not to be construed in any fashion calculated to limit the appended claims short of the true and most comprehensive scope of the invention in the art.

The illustrations in the drawing are all schematic in nature,

Fig. 1 representing a sectional elevation of an apparatus which may be utilized for practice of the method as a batch procedure;

Fig. 2 a longitudinal sectional elevation of apparatus in which the method may be practiced as a continuous procedure; and Fig. 3 a cross-sectional detail on substantially line 3—3 of Fig. 2.

In the rendering of fats by heat, as for example in the rendering of hog fat for production of lard, it is desired to extract from the natural tissue as much of the fat as possible, and to avoid so far as possible the deleterious effects on the fat such as may result from its partial decomposition or breaking down, or oxidation or other modifications of the retaining tissues, under the action of the heat or other influences present during the rendering. The latter is of particular importance where the fat is to be used as a constituent of or in the preparation of foods, as the presence of free fatty acids or other decomposition products from the fat or the retaining tissue adversely affects the keeping quality of the product and results in rancidity and other undesirable modifications in its taste and color. It is recognized that prolonged heating and excessive heating of the fat-containing tissue are productive of these deleterious and undesirable effects. For example, the best neutral lard is obtained by treating small batches at comparatively low temperatures. Such procedure, however, is necessarily costly, particularly as regards the proportion of time required to the quantity of product, and this results from the length of time required to heat a batch under the necessary limitations of the applied temperature.

The present invention provides a method whereby the uniform heating of the entire mass of fat-containing tissue may be effected very rapidly without any of the mass being subjected to temperatures productive of deleterious effects.

Described generally, the method of the present invention contemplates a preliminary treatment of the fat-containing tissue in such fashion as to form a fairly homogeneous mass having an appreciably higher electrical conductivity than the fat-containing tissue before such preparation, and then subjecting the mass to the passage of electrical current at such density as to generate throughout the mass a temperature sufficiently high to render out the fat. Incident to such heating the mass may be subjected to pressure for the purpose of augmenting its conductivity to the current and increasing the separation of the liquid fat from the retaining tissue. The application of the current to the mass should be sufficiently distributed to obtain an approximately uniform current density throughout the mass.

The invention will be understood in more detail from an explanation of certain examples, which will be made by reference to the accompanying drawing. For the production of lard, for example, the suitable hog fat is cut up, as in a chopper of conventional sort, into comparatively small pieces, as of the order of one-half inch or one-quarter inch cubes, and with it is thoroughly mixed a small portion of ordinary salt, for example one-tenth of one per cent to one-fourth of one per cent by weight. This mixing of the salt with the fat may be accomplished quite rapidly and quite thoroughly by the chopper. For batch procedure, a suitable quantity of the fat as thus prepared is packed with approximately uniform density in a rendering receptacle, such as the receptacle designated 10 in Fig. 1, which receptacle is either constructed of a material which is electrically non-conductive, or has an electrically non-conductive lining as indicated at 11. The receptacle has an electrically conductive perforate bottom 12 upon which the charge of fat is supported, and a draining bottom 14 for receiving the discharge from the perforate bottom. A pressing plunger 15 is arranged to operate in the receptacle 10 so as to apply pressure uniformly over the entire top of the contained charge or mass of fat-containing tissue, which latter is indicated generally at 16. This pressing plunger presents on its lower surface, for contact with the mass 16, an electrode 17, suitably electrically insulated from the operating parts. The electrodes 12 and 17 are connected across a suitable source of high frequency alternating current, such as the motor generator 18. The electrodes 12 and 17 being in contact with the opposite surfaces of the mass 16, the application of a suitable potential to said electrodes at a proper alternating high frequency will pass a high frequency current through the mass 16. This current will generate heat in the mass, the temperature obtained in a given time being dependent on the current density. Although the fat-containing tissue in its natural condition might constitute a very poor conductor, the modification by comminuting it and/or addition of salt as above described reduces its resistance to a comparatively low value and gives it a high thermal efficiency under a current of the sort described. As a consequence, heat is generated in it rapidly by the passage of the high frequency current, and the distribution of heat is practically uniform throughout the mass The frequencies which are effective are those substantially higher than the ones used generally on service lines, yet lower than radio frequencies. Although frequencies ranging from 240 to 2500 cycles per second are feasible under various conditions, the distinctly effective range of frequencies is between about 500 and 2000 cycles per second, and within this range the frequencies above 1000 cycles per second are most effective. Highly important results are obtained by the use of these high frequencies. The passage of current between the electrode and the mass is effected without corrosion, or burning or searing effects, and a substantially uniform distribution of the current and thermal effects throughout the mass is obtained. Consequently, the mass is heated up throughout at a uniform rate, and the rendering out of the fat from the tissue in the center of the mass begins approximately as soon as it does elsewhere in the mass. The pressure applied by the plunger serves to maintain the electrodes firmly in contact with the mass, so that the application of the current will be continuous as the mass is reduced in volume by the extraction of the rendered fat, and such pressure serves also to expedite the separation of the rendered fat from the tissue and the mass. The rendered fat drains through the perforate bottom 12 into the draining bottom 14, whence it is conducted to filters or other apparatus for such further treatment as may be desired. The temperature generated in the mass may be definitely controlled by appropriate regulation of the applied voltage, so that the maximum temperature to which the mass is subjected may be held to any desired limit. Thus the temperature to which the mass is subjected may be changed at different stages in the procedure, a selected temperature being employed for the first part of the rendering, and a higher temperature thereafter being applied. The fat removed under the higher temperature may be kept separate from that taken off under the lower temperature. The pressure may be applied to the point of expressing from the tissue almost all of the fat.

Highly important results are obtained from the rapid and uniform heating of the mass. None of the fat or the fat-containing tissue is subjected to an undesirably high temperature, nor is any of the fat or fat-containing tissue subjected to the heat for an unduly long time. As a consequence, the possibility of hydrolyzation of the fat is minimized, as is also the possibility of oxidation dehydration or other undesirable modification of the fat-containing tissue. These factors result in certain highly desirable characteristics of the product. For example, the free fatty acid content of the product is limited to a very small quantum, as is particularly apparent in the comparison of lard rendered by this process with lard obtained by steam rendering of similar fat-containing tissue. Lard rendered by the present process is also free from much of the color which is ordinarily found in unrefined steam rendered lard. Even without treatment with fuller's earth, lard rendered by this process is much whiter than steam rendered lard which has been treated with fuller's earth in the usual manner. The flavor characteristics of lard rendered by this method are particularly desirable as it is approximately neutral or devoid of taste. The salt used in the preliminary treatment of the fat-containing tissue does not go out with the fat in the rendering, but remains in the water held by the residual tissue. Because of the rapid and uniform heating of the mass in the rendering, it is not necessary to employ such high temperatures or hold the mass under heat for a time such as to result in any appreciable evaporation of water from the tissue. The water thus remaining in the tissue retains the salt and limits to a large extent the capacity of the residual tissue for reabsorbing the melted fat. Consequently, it is possible to extract from the tissue, by the present method, a higher proportion of the fat than is feasible in methods in which higher temperatures or more prolonged heating are involved.

It appears that the action of the high frequency current in the mass is effective to reduce very materially the opportunity for enzymatic and other decomposing action. The action of the high frequency current appears to lower the resistivity of enzymes and organisms to heat, so that their action may be stopped at temperatures which are reached very early in the heating of the mass by the high frequency current.

In Figs. 2 and 3 is illustrated schematically a type of apparatus in which the method may be carried on as a continuous procedure. In these illustrations the reference numeral 20 designates a feeder casing in which operates a screw conveyor 21 driven continuously from a suitable source 22. This feeder casing conjoins a rendering receptacle 24 into which operation of the conveyor 21 is adapted to feed at a suitable rate the fat-containing tissue from the hopper 25. The rendering receptacle has a bottom formed as a sump with perforate portions 26 over a draining receptacle 27. The rendering apparatus is so arranged as to subject material fed therethrough to compression, which effect may be obtained by forming the rendering receptacle with decreasing cross-sectional area as illustrated. At its termination, the rendering receptacle communicates with a discharge receptacle 28 in which is a screw conveyor 29 operable to discharge material from the rendering receptacle. The conveyor 29 is operable continuously from a suitable source 30.

The rendering receptacle 24 may be made of electrically non-conductive material, or it may be lined with non-conductive material as indicated at 31, and within it, suitably insulated from each other and from the casing, are electrodes 32 suitably disposed for extensive surface contact with the mass of material contained in the rendering receptacle. These electrodes preferably are disposed at uniform spacing from each other, and they are connected across a source of suitable high frequency voltage, such as the motor generator 34.

In use of this apparatus for practice of the method, the fat-containing tissue, after being suitably prepared by subdivision into small pieces and/or otherwise treated to give it the desired electrical conductivity, as by addition of salt, is deposited in the hopper 25, and by operation of the conveyor 21 is fed continuously into and through the rendering receptacle 24. In the rendering receptacle it is subjected to compression, by the continued operation of the conveyor and the resistance offered to its movement by the rendering receptacle, so that it is formed into a compact composite mass. By the action of the conveyor 21 this mass is moved progressively through the rendering receptacle, encountering the electrodes 32 as it proceeds, and being subjected to increasing compression which serves to maintain the mass in close contact with the electrodes. During its movement between the electrodes, there is passed through the mass of material a high frequency current which has the effect of generating heat as above described. The fat which is rendered out of the tissue runs downwardly through the moving mass of material and into the sump, whence it is discharged through the perforate portions 26. In this movement the heated fat passes through the material which is below the electrodes, and serves to heat the material not yet subject to the heat-generating current.

Upon reaching the terminus of the rendering receptacle 24, the residue tissue, from which the greater proportion of the originally contained fat has by that time been rendered out, is discharged into the discharge receptacle 28, through which it is conveyed by the action of the conveyor 29. The amount of compression and the rate of movement to which the material is subjected during its passage through the rendering receptacle may be definitely controlled by regulation of the relative speeds of the conveyors 21 and 29. In addition to thus controlling the pressure or back pressure on the material in the rendering receptacle, the conveyor 29 may function as a press element for obtaining the final extraction of the fat from the residue material in the discharge receptacle. To accomplish this, the discharge receptacle and conveyor 29 may be constructed as press members with which the adjustable press cone 35 cooperates to increase compression of the material in the receptacle 28, the liquids expressed being discharged to the collector 36 and the residual tissue being discharged as tailings at the chute 37. To aid in the extraction of the fat in the press, the receptacle 28 may be suitably heated.

It will be apparent that with the use of this method the handling of the material and extraction of the fat may be carried on as a continuous procedure, quite rapidly, with all of the advantages above described, and that a very high percentage of the fat contained in the material may be recovered in the course of the procedure.

We claim:

1. A process for rendering fat from fat-containing tissue which comprises treating the fat-containing tissue to increase its electrical conductivity and then applying electrodes to a mass of the treated tissue and passing through the mass an electric current in density sufficient to generate in the tissue subjected thereto heat of a temperature adequate to render fat out of said tissue and permitting the rendered fat to drain away from the tissue during the heating thereof.

2. A method of rendering fat from fat-containing material which comprises treating the material to render it conductive to a high frequency electric current and then applying electrodes to a mass of the material and passing through the mass a high frequency electric current in sufficient density to generate throughout the mass of material subjected to said current density a temperature adequate to render out fat contained in said material.

3. A process as specified in claim 2 and wherein the current-producing voltage is applied immediately to extensive surface areas of the mass.

4. A process as specified in claim 2 and wherein the frequency of the current is of the order of 1000 to 2500 cycles per second.

5. A process as specified in claim 1 and including the subjection of the mass of material to compression during the passing of the current therethrough.

6. A process as specified in claim 2 and including subjecting the mass of material to compression during the passage of the current therethrough.

7. A process of rendering fat from fat-containing material which comprises subdividing the material into pieces, mixing salt with the material, and passing through a mass of the material thus prepared an electric current at high frequency in sufficient density to generate throughout the mass subjected thereto a rendering heat, the current-producing voltage being applied to the mass over an extensive surface area thereof.

8. A process as specified in claim 7 and wherein the current passed through the material is of a frequency approximating 1500 cycles per second.

9. A process as specified in claim 7 and including subjecting the mass of material to compression during the passing of the current therethrough.

10. A process of rendering fat from fat-containing material which comprises treating the material to render it conductive to high frequency electrical current, feeding the material progressively in a continuous stream, passing through the stream in the course of its travel a high frequency electric current in density sufficient to generate a rendering heat in the material subjected thereto, and permitting the rendered fat to drain from the portions of the stream through which the current is passing.

11. A process as specified in claim 10 and wherein the material in the stream is subjected to compression in the course of its progress and during the passage of the current through it.

12. A process as specified in claim 1 and wherein material in the stream is subjected to contact with the heated rendered fat for purpose of heat exchange, before it is subjected to the electric current.

13. A method for rendering constituents from organic material which comprises treating the material to increase its electrical conductivity, passing high frequency electric current through a mass of the material and permitting the rendered constituents to drain out of the mass while the current is passing therethrough.

14. A process for rendering fat from fat-containing tissue which comprises treating the tissue to render it readily conductive to electrical current, passing the treated tissue in a stream between and in contact with electrodes of opposite polarity, passing through the portion of the stream between the electrodes an electric current in density sufficient to generate in said tissue heat of a temperature adequate to render fat out of the same, and draining rendered fat out of said portion of the stream while the current is passing therethrough.

15. A method of rendering fat from fat-containing tissue which comprises treating the tissue to render it conductive to electric current, passing the material as a stream between and in contact with electrodes, passing through the portion of the stream between the electrodes an electric current in density sufficient to generate therein heat effective to melt the fat, and draining the melted fat from said portion of the stream into a portion of the stream approaching the electrodes.

HALVOR ORIN HALVORSON.
EDWARD M. SCHMITZ.
ROBERT C. MURRAY.